UNITED STATES PATENT OFFICE.

IGNAZ KREIDL, OF VIENNA, AUSTRIA-HUNGARY.

WHITE ENAMEL.

1,117,197.  Specification of Letters Patent.  Patented Nov. 17, 1914.

No Drawing.  Application filed October 30, 1912.  Serial No. 728,558.

*To all whom it may concern:*

Be it known that I, IGNAZ KREIDL, partner of the firm Vereinigte chemische Fabriken, Landau, Kreidl, Heller & Co., of Sebastian-Kohlgasse 5–7, Vienna, XXI, Austria-Hungary, a subject of the Emperor of Austria-Hungary, residing at Sebastian-Kohlgasse 5–7, Vienna, XXI, in the Empire of Austria-Hungary, have invented a new and useful Improved White Enamel, of which the following is a specification.

This invention relates to improved white enamels, glass and the like.

In the specification belonging to my United States Patent No. 1,101,455, dated June 23, 1914, an improved process for the manufacture of white enamels is described, the main feature of which is that the cloudening agents used, consist in hydrates of metal compounds suitable for cloudening purposes, which hydrates contain alkali.

In my later application for Letters Patent Ser. No. 721349 of the 20 Sept., 1912, a process for the manufacture of white zirconium enamels is described which consists in the employment of anhydrous zirconium compounds poor in alkali as clouding agents instead of alkaline hydrates of zirconium compounds.

I have now found that the most successful covering effects are obtained with these alkaline or weak alkaline clouding agents if they contain from 2–7% of alkali metal, preferably between 3 and 4%. The most suitable percentage of alkali ranging within the aforementioned limits can be easily determined empirically for each separate compound used for clouding purposes.

What is claimed is:

1. A white enamel containing, as a clouding agent, a metal compound suitable for clouding purposes in combination with alkali, the content of alkali metal being between 2% and 7%.

2. A white enamel containing, as a clouding agent, a zirconium composition containing between 2% and 7% alkali metal.

3. A white enamel containing, as a clouding agent, a metal compound suitable for clouding purposes in combination with alkali, the content of alkali metal being between 3% and 4%.

4. A white enamel containing, as a clouding agent, a zirconium composition containing between 3% and 4% alkali metal.

5. A white enamel containing, as a clouding agent, a metal oxid suitable for clouding purposes in combination with alkali, the content of alkali metal being between 2% and 7%.

6. A white enamel containing, as clouding agent, a compound suitable for clouding purposes, in combination with silicic acid and alkali, the content of alkali metal being between 2% and 7%.

In testimony whereof I have signed my name to this specification in the presence of two subscribing witnesses.

IGNAZ KREIDL.

Witnesses:
 HUGO REIK,
 AUGUST FUGGER.